United States Patent [19]

Yamamoto et al.

[11] Patent Number: 5,426,526
[45] Date of Patent: Jun. 20, 1995

[54] REFLECTION TYPE SINGLE CRYSTAL SILICON SUBSTRATE LIQUID CRYSTAL DISPLAY DEVICE AND SYSTEM

[75] Inventors: Yoshitaka Yamamoto, Yamatokoriyama; Yutaka Ishii, Nara, both of Japan

[73] Assignee: Sharp Kabushiki Kaisha, Osaka, Japan

[21] Appl. No.: 863,458

[22] Filed: Apr. 6, 1992

[30] Foreign Application Priority Data

Apr. 5, 1991 [JP] Japan .................................. 3-073294

[51] Int. Cl.⁶ .......................................... G02F 1/1333
[52] U.S. Cl. ........................................ 359/82; 359/51; 359/54; 359/59
[58] Field of Search ....................... 359/54, 59, 70, 82, 359/51, 52, 42, 88; 257/55, 67, 350, 352, 353, 387, 388, 412; 353/31, 122; 358/120

[56] References Cited

U.S. PATENT DOCUMENTS

| | | | |
|---|---|---|---|
| 3,912,386 | 10/1975 | Gorog et al. | 353/122 |
| 4,677,742 | 7/1987 | Johnson | 257/55 |
| 4,904,049 | 2/1990 | Hegg | 385/120 |
| 5,022,750 | 6/1991 | Flasck | 353/31 |
| 5,024,524 | 6/1991 | Flasck | 353/31 |
| 5,042,919 | 8/1991 | Yabu et al. | 359/88 |
| 5,172,203 | 12/1992 | Hayashi | 257/67 |
| 5,206,749 | 4/1993 | Zavracky et al. | 359/59 |

FOREIGN PATENT DOCUMENTS

| | | |
|---|---|---|
| 034409 | 8/1981 | European Pat. Off. . |
| 0028712 | 2/1987 | Japan .................................. 359/51 |
| 0241520 | 9/1989 | Japan .................................. 359/51 |
| WO91/02372 | 2/1991 | WIPO . |

OTHER PUBLICATIONS

M. N. Ernstoff "A Head-Up Display For the Future" Proceedings of the S.I.D. vol. 19, No. 4, 1978, pp. 169–179.

Y. Hirai et al., "Phase Diagram And Phas Separation In LC/Prepolymer Mixture" /SPIE vol. 1257 Liquid Crystal Displays And Applications (1990).

J. Fergason, "Polymer Encapsulated Nematic Liquid Crystals For Display And Light Control Applications", SID 85 Digest, vol. 68 (1985).

T. Fujisawa et al., "Electro-Optic Properties And Multi-Plexibility For Polymer Network Liquid Crystal Display (PN-LCD)" vol. 690 Japan Display (1989).

*Primary Examiner*—William L. Sikes
*Assistant Examiner*—Huy Mai
*Attorney, Agent, or Firm*—David G. Conlin; George W. Neuner; Brian L. Michaelis

[57] ABSTRACT

A single crystal silicon substrate organic polymer liquid crystal display device uses a first light incident substrate, a second substrate opposed to the first substrate, the second substrate being formed of a single crystal silicon, and an organic polymer liquid crystal material between the first and second substrates.

18 Claims, 12 Drawing Sheets

△— OBSERVER

REFLECTION TYPE SINGLE CRYSTAL SILICON SUBSTRATE LIQUID CRYSTAL DISPLAY DEVICE AND SYSTEM

BACKGROUND OF THE INVENTION

1. Field of the Invention

The present invention relates to a reflection liquid crystal display device having a liquid crystal enclosed between a pair of substrates opposed to each other and to a liquid crystal display system using the liquid crystal display device.

2. Description of the Prior Art

Liquid crystal display devices are used in a wide range of apparatuses from an electronic calculator to in a portable TV. A display device, which especially requires clear colors, generally employs an active matrix liquid crystal display device equipped with a switching transistor and the like for each pixel.

Representative display modes used in the active matrix liquid crystal display device include the twisted nematic mode, the dynamic scattering mode, and the guest-host mode. Hereinafter, the liquid crystal display device will be referred to as the "LCD device", the twisted nematic mode as the "TN mode", the dynamic scattering mode as the "DS mode", and the guest-host mode as "GH mode".

In the TN mode, the liquid crystal cell interposed between a pair of polarizing plates includes liquid crystal molecules which are twisted at 90° as the initial alignment. An image is displayed utilizing optical characteristics of the cell, namely, the optical rotatory polarization under no electric field and the depolarization under an electric field.

The TN mode has the following problems. Since the polarization of light is utilized, only 50% or lower ratio of light emitted from a light source is effectively used, thereby darkening the displayed image. Further, an alignment film is required. Static electricity generated by rubbing the alignment film destroys the transistor and attracts dust thereto.

In the DS mode, a voltage higher than a certain level is applied to the liquid crystal cell to scatter the liquid crystal molecules, thereby scattering the light incident on the liquid crystal display device. An image is displayed utilizing the scattered light.

The DS mode has problems of a low resistance of the liquid crystal, a large power consumption, and a low speed of response (50 to 100 ms) at the time of voltage supply.

In the GH mode, a liquid crystal material including a dichroic coloring matter is used. Utilizing the phenomenon that the direction of alignment is changed by the application of an electric field, the direction of alignment of the colored liquid crystal molecules is changed, thereby changing the color of the liquid crystal cell. An image is displayed by such change of the color of the liquid crystal cell.

The GH mode has problems of dark display to causing a low contrast (approximately 3 to 5) due to a display principle thereof and a low speed of response (100 to 200 ms).

In general, a liquid crystal display device includes a glass substrate and a thin film transistor for controlling display. Characteristics of the transistor depend on the material of the thin film. Usually, the thin film is formed of amorphous silicon, low-temperature polysilicon or high-temperature polysilicon. Hereinafter, the thin film transistor will be referred to as the "TFT".

An amorphous silicon TFT is formed by CVD or sputtering. Since the amorphous silicon film can be formed at a low temperature of approximately 350° C. or lower, an inexpensive ordinary glass, for example, Corning 7059 produced by Corning Inc. can be used as the substrate. Moreover, a relatively large display device which is up to 15 inches across can be realized. For these advantages, most active matrix LCD devices employ the amorphous silicon TFT.

The amorphous silicon TFT has the following problems:

(1) Due to a great number of traps of the amorphous silicon, the thin film has an electric field mobility of 1 $cm^2V^{-1}S^{-1}$ or less. A transistor having such a thin film has a large resistance at ON.

(2) Since the ordinary glass used for the substrate cannot be processed at a high temperature of 600° C. or higher, it is impossible to use a thermal oxide film, which has a high breakdown voltage and hardly generates any pin holes. Therefore, in the case when a driving circuit or the like requires a complicated structure and excellent performance, such a circuit cannot be mounted on the same substrate as a TFT.

A polysilicon TFT has a higher electric field mobility than that of the amorphous silicon TFT. Owing to a polysilicon thermal oxide film used as a gate oxide film constituting the TFT, the TFT has high transistor characteristics. Further, since the polysilicon TFT can be self-aligned using an ion implantation technology, a simple driving circuit can be formed integratedly with the TFT. However, since the production of a high quality polysilicon requires a high processing temperature of 600° C. or higher, expensive quartz glass is used for the substrate. Therefore, the polysilicon TFT is mainly used for an LCD device having a relatively small display area such as the one in a viewfinder of a video tape recorder. Examples of the polysilicon TFT include a low-temperature polysilicon TFT and a high-temperature polysilicon TFT.

The whole process of producing the low-temperature polysilicon TFT is conducted at 550° to 600° C., using a heat resistant glass as the substrate. If necessary, annealing is conducted for a long period of time or recrystallizing by the use of laser is conducted. This type of TFT, which has an electric field mobility of 50 $cm^2V^{-1}S^{-1}$ in $\mu_e$ (electronic mobility) and 15 $cm^2V^{-1}S^{-1}$ in $\mu_h$ (hole mobility), generally has better characteristics than those of the amorphous silicon TFT.

The high-temperature polysilicon TFT is mounted on a highly heat-resistant quartz substrate. Since the production of the high-temperature polysilicon TFT is conducted at a high temperature of up to approximately 1,200° C., almost all the processes used for producing an integrated circuit (hereinafter, referred to as the "IC") can be used. This type of TFT, which has an electric field mobility of 100 to 400 $cm^2V^{-1}S^{-1}$ in $\mu_e$ and 50 to 150 $cm^2V^{-1}S^{-1}$ in $\mu_h$, has the best characteristics of the three types of TFTs mentioned above.

The polysilicon TFT has better characteristics than those of the amorphous silicon TFT as mentioned above. Therefore, a driving circuit can be mounted on the same substrate as the TFT.

However, the polysilicon TFT has a low speed of response. For an experiment, complementary metal oxide semiconductor (hereinafter, referred to as "CMOS") shift registers were produced of a low-temperature polysilicon TFT and a high-temperature polysilicon TFT. Under a voltage of 15 V, the shift register produced of the low-temperature polysilicon TFT showed a maximum operating frequency of approximately 5 MHz, and the shift register produced of a high-temperature polysilicon TFT showed that of approximately 15 MHz. These values are sufficient for a shift register for processing, for example, 2,000 scanning lines at 60 Hz, but are not sufficient for a data driver of an LCD device for driving 2,000×2,000 pixels at 60 Hz.

The polysilicon TFT has a large leak current. Therefore, an increase of the ON/OFF ratio requires increasing the size of the transistor or connecting the transistors in series. Accordingly, in the case when a driving circuit, a switching circuit or the like requires a complicated structure, such a circuit cannot be mounted on the same substrate as the TFT. Moreover, the polysilicon TFT having the above inconvenience is not suitable to a certain type of liquid crystal material which requires a high voltage for driving. A high quality display cannot be realized in the case when a liquid crystal material which has a low resistance or requires a high voltage for switching is used.

The driving circuit, a memory circuit, a logic circuit and other circuits necessary for the LCD device are formed by a method for mounting IC chips having such functions on the substrate, namely, by a tape automated bonding method (hereinafter, referred to as the "TAB method" or a chip on glass method (hereinafter, referred to as the "COG method"). These methods will be described in detail with examples.

The TAB method is the main method for connecting a driving IC chip to a high precision LCD panel. FIGS. 1a through 1c illustrate an example of the TAB method. As is shown in FIG. 1a, connecting terminals 21 are formed on an electrode of a driving IC chip 20. Each connecting terminal 21 is formed of gold and has a height of approximately 20 μm. A tape carrier 22 has a film 22a formed of polyimide or the like, and a connecting terminal 22b formed of a copper wiring coated with gold or tin on the film 22a. The connecting terminals 21 and 22b are positionally aligned and connected by thermo compression bonding using a heating jig 23. Then, the portion of the IC chip 20 exposed to the thermo compressing bonding is sealed with a resin 24 (FIG. 1b) to obtain a TAB substrate 20a. Only a TAB substrate which has passed an inspection is mounted on a glass substrate 25a of a display panel 25 by heating an anisotropic adhesive agent 26 by a heating jig 27 (FIG. 1c). According to the TAB method, the TAB substrate 20a can be inspected after the IC chip 20 is connected with the film 22a and is sealed with the resin 24. Therefore, only a satisfactory TAB substrate with no defects can be mounted on the display panel 25. As a result, the completed display panel 25 has few defects attributable to the IC chip 20. Moreover, the IC chip 20 is mounted on the display panel 25 through the connecting terminal of the glass substrate 25a and the connecting terminal 28 of the tape carrier 22, which requires a small connecting area. On the other hand, the TAB method has the following disadvantages:

(1) A large number of parts are necessary including the tape carrier 22 formed of an expensive material such as polyimide and a printed circuit board.

(2) The method requires a lot of processes.

(3) Since the pattern processing of cutting the tape carrier 22 is limited and the electrode of the TAB substrate 20a and the display panel 25 are connected under the restriction of the resolution, the connection cannot be done in the case when the connecting pitch is microscopic (practically, 100 μm or less).

(4) Since the IC chip 20 and the display panel 25 are connected by the connecting terminal 28, the wiring is lengthened to increase a parasitic capacitance, thereby resulting in a low operating speed.

(5) An increased number of the electrodes of the TAB substrate 20a heightens the unstableness of the connection for the inspection and undesirably increases the area of electrodes to be inspected. The impossibility of dealing with the microscopic connecting pitches and the low operating speed are especially serious. For these reasons, the TAB method cannot be applied for a high precision, high density LCD device.

According to the COG method, the connecting terminal of the glass substrate of the display panel and the connecting terminal of the IC chip are directly connected. FIG. 2a through 2d illustrate an example of the COG method. As is shown in FIG. 2a, a display panel 30 includes a pair of glass substrates 30a and 30b and a liquid crystal 30c sandwiched therebetween. An ITO (indium tin oxide) terminal 30d for connecting a driving IC chip 31 to the display panel 30 is formed in advance on a peripheral portion of the glass substrate 30a. A connecting terminal 31a of the IC chip 31 is coated with a conductive adhesive agent 32. Then, the ITO terminal 30d and the connecting terminal 31a are positionally aligned (FIG. 2b), and are connected (FIG. 2c). After that, a sealing resin 33 is filled between the IC chip 31 and the glass substrate 30a (FIG. 2d).

FIG. 3 illustrates a connecting section of the IC chip 31. The IC chip 31 has an aluminum (Al) pad 31b thereon. The Al pad 31b is covered with a passivation film 31c formed of silicon nitride ($Si_3N_4$) except for an opening. The Al pad 31b is superposed by the connecting terminal 31a (formed of gold) through a copper layer 31d for coating. The connecting terminal 31a is adhered on the ITO film 30d on the glass substrate 30a with the conductive adhesive agent 32.

FIGS. 4a through 4e illustrate processes of producing the connecting section of the IC chip 31 by the COG method. The Al pad 31b is formed on a specified position of a substrate 31e of the IC chip 31. On the Al pad 31b, the passivation film 31c formed of $Si_3N_4$ is formed (FIG. 4a). The Al pad 31b is etched to make the opening. The copper layer 31d for coating is formed on the Al pad 31b (FIG. 4b). The whole surface of the copper layer 31d is coated with a photo-resist film 31f, and exposed and developed to make an opening in the photo-resist film 31f above the opening of the Al pad 31b (FIG. 4c). Then, the photo-resist film 31f having the opening is coated with the connecting terminal 31a (FIG. 4d), and the photo-resist film 31f is removed (FIG. 4e). In the connecting section obtained in this way, an opening made by removing the photo-resist film 31f has a thickness of approximately 80 μm, and the connecting terminal 31a has a thickness of approximately 50 μm. The connecting section has a diameter of approximately 170 μm. Although a smaller diameter of the connecting section can be realized by increasing the thickness of the photo-resist film 31f, it is usually difficult to increase the thickness of the photo-resist film 31f to 5 μm or thicker. As a result, the connecting section cannot be very small.

The COG method has the following advantages:

(1) A small number of necessary parts and a simple procedure lowers the production cost, which is especially effective since the number of the driving IC chips increases in accordance with an increase of the number of the pixels in the LCD device.

(2) The direct connection of the IC chip on the glass substrates serves to produce a thin LCD device.

(3) The yielding ratio and the quality of the IC chip is enhanced due to a small number of connecting positions.

On the other hand, the COG method has the following disadvantages:

(1) The connecting terminals on the IC chip and the glass substrate are damaged due to a temperature change since silicon forming the IC chip and the glass substrate have different coefficients of thermal expansion. While the coefficient of thermal expansion of silicon is $3.5 \times 10^{-6}/°C$, that of glass is approximately 5.0 to $7.0 \times 10^{-6}/°C$. The connecting section is possibly cracked by heightening and lowering the temperature in repetition, thus resulting in a low reliability.

(2) The sealing resin is filled between the IC chip and the glass substrate in order to minimize the affects of the thermal stress caused by the above difference of the coefficient of thermal expansion. This requires a space between the IC chip and the glass substrate, which requires the connecting section to be thicker. Practically, in the case when the thickness of the connecting section is 50 $\mu$m, the diameter thereof becomes 170 $\mu$m. Accordingly, a large area is necessary for connection.

(3) Since the ITO terminal is connected to the glass substrate, the IC chip cannot be processed using the microscopic processing technology. Due to a low density of the connecting terminals caused by the above reason, the method cannot be used for a high density LCD device having a pitch between pixels of several tens of micrometers. The low density of the connecting terminal also enlarges the area for connecting the IC chip and the glass substrate.

The above-mentioned three disadvantages are all serious. The excessive thermal stress lowers the reliability of the display device and deteriorates the characteristics of the IC chip. Due to the impossibility of microscopic processing and the necessity of a large connection area, the COG method cannot be used for an LCD device which is microscopic and has a high density. Moreover, the glass substrate has an inferior heat radiation. While silicon has a thermal conductivity of 123 W/m·K, and aluminum has that of 238 W/m·K, glass has that of approximately 1.2 W/m·K. In other words, the thermal conductivity of glass is smaller than those of silicon and aluminum by two digits. Accordingly, in the case when the temperature of the parts on the glass substrate and the liquid crystal is increased, the heat is hardly radiated through the glass substrate. As a result, in the case when temperature is a problem, such as when heat is generated in the silicon IC or a high intensity light is radiated to the LCD device, a special cooling device is necessary.

SUMMARY OF THE INVENTION

The liquid crystal display device of this invention, which overcomes the above-discussed and numerous other disadvantages and deficiencies of the prior art, comprises a first substrate on which light is incident, a second substrate opposed to the first substrate, and a liquid crystal layer interposed between the first and second substrates, wherein the second substrate is formed of a single crystal silicon, and the liquid crystal layer is formed of an organic polymer and a liquid crystal material.

In a preferred embodiment of the invention, the second substrate has a switching circuit thereon.

In a preferred embodiment of the invention, the switching circuit comprises a silicon gate n-channel metal oxide semiconductor transistor.

In a preferred embodiment of the invention, the switching circuit comprises a metal oxide semiconductor transistor having a high breakdown voltage.

In a preferred embodiment of the invention, the switching circuit comprises a diffusion self aligned metal oxide semiconductor transistor.

In a preferred embodiment of the invention, the second substrate has a circuit device mounted thereon.

In a preferred embodiment of the invention, the circuit device includes at least one of an image processing circuit, a liquid crystal driving circuit, and a memory circuit.

Alternatively, the liquid crystal display device of this invention comprises a first substrate on which light is incident, a second substrate opposed to the first substrate, a liquid crystal layer interposed between the first and second substrates, and pixels arranged in a matrix, wherein the second substrate is formed of a single crystal silicon, the liquid crystal layer is formed of an organic polymer and a liquid crystal material, and the pixels are divided into three portions respectively attached with red, green and blue filters.

The liquid crystal display system of this invention comprises three liquid crystal display devices, each comprising a first substrate on which light is incident, a second substrate opposed to the first substrate and formed of a single crystal silicon, and a liquid crystal layer interposed between the first and second substrates and formed of an organic polymer and a liquid crystal material, wherein and red, green and blue filters respectively attached to the three liquid crystal display devices.

Alternatively, the liquid crystal display system comprises a light source; a reflection liquid crystal display device having a first substrate on which light emitted from the light source is incident, a second substrate opposed to the first substrate and including a single crystal silicon, and a liquid crystal layer including an organic polymer and a liquid crystal material; a fiber optic plate, to which the light incident on and reflected by the liquid crystal display device is led; and a screen for receiving the light transmitted through the fiber optic plate.

In a preferred embodiment of this invention, the light emitted from the light source is incident on a surface of the first substrate of the reflection liquid crystal display device in an inclined state, and the fiber optic plate is disposed on a path of the light reflected by the reflection liquid crystal display device.

Thus, the invention described herein makes possible the objectives of providing a liquid crystal display device which has satisfactory transistor characteristics, which can be equipped with a driving circuit, an image processing circuit, a memory circuit and the like mounted on a peripheral surface of a substrate, which displays a bright image due to no use of a polarizing plate, and which has a high speed of response, and of providing a compact and inexpensive liquid crystal display system using the above liquid crystal device which can be used in the High Definition Television system or a three-dimensional display system and which has an excellent contrast.

BRIEF DESCRIPTION OF THE DRAWINGS

This invention may be better understood and its numerous objects and advantages will become apparent to those skilled in art by reference to the accompanying drawings as follows:

FIG. 12b is a view illustrating light from a liquid crystal display device of the system of FIG. 12a.

DETAILED DESCRIPTION OF THE PREFERRED EMBODIMENTS

The present invention will be described by way of illustrating embodiments with reference to the accompanying drawings.

EXAMPLE 1

Figure 5:
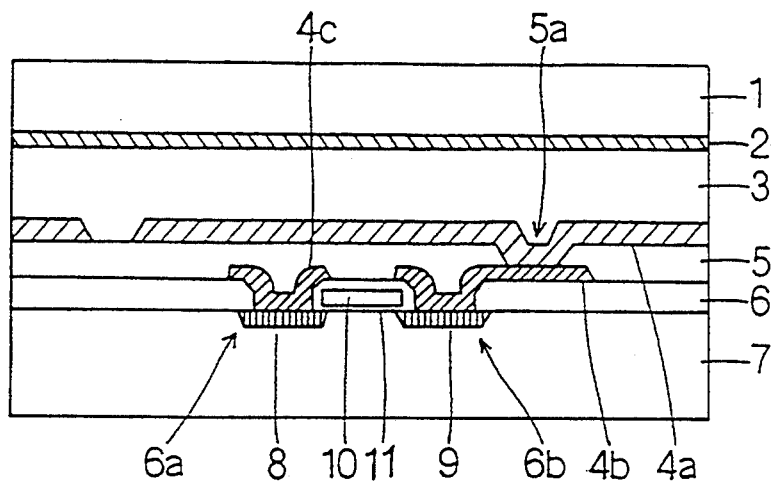
FIG. 5 is a view showing a construction of a reflection liquid crystal display device according to a first example of the present invention.

FIG. 5 is a cross sectional view of a reflection LCD device according to an example of the present invention, in which a silicon gate NMOS switching circuit is mounted on a substrate.

The LCD device according to this example includes a single crystal silicon substrate 7 and a field silicon oxide film 6 disposed on the single crystal silicon substrate 7. The field silicon oxide film 6 has throughholes 6a and 6b. Aluminum electrodes 4b and 4c are formed on inside and bottom surfaces of the throughholes 6a and 6b and on the field silicon oxide film 6 in the vicinity of upper peripheries of the throughholes 6a and 6b, respectively. The single crystal silicon substrate 7 has a source area 8 below the aluminum electrode 4c and a drain area 9 below the aluminum electrode 4b.

A gate insulating film 11 and a gate electrode 10 are disposed between the throughholes 6a and 6b. The gate electrode 10 is covered with a silicon oxide film or the like to avoid shortcircuiting with the aluminum electrodes 4b and 4c. Although the gate electrode 10 is formed of polysilicon in this example, other materials can be used. The field silicon oxide film 6 having the throughholes 6a and 6b, the aluminum electrodes 4b and 4c, the gate electrode 10, and the gate insulating film 11 constitute a MOS switching circuit.

The aluminum electrodes 4b and 4c and the field silicon oxide film 6 are covered with a protective film 5 for protecting the MOS switching circuit. The protective film 5 has a throughhole 5a above the aluminum electrode 4b. Inside and bottom surfaces of the throughhole 5a and the protective film 5 are superposed by a reflective film 4a also acting as an electrode. Although the reflective film 4a is formed of aluminum having a high reflectance in this example, other materials can be used. In order to reduce resistance caused by the contact of the reflective film 4a and the aluminum electrode 4b, heat processing should be done after the reflective film 4a is formed. However, the heat processing roughens a surface of the reflective film 4a to lower the reflectance thereof. For the purpose of smoothing the surface of the reflective film 4a to improve the reflectance thereof, a surface rubbing and smoothing process is conducted after the protective film 5 is formed and again after the above-mentioned heat processing is finished.

After the reflective film 4a is formed, a transparent glass substrate 1 having a transparent counter electrode 2 on a lower substrate thereof is disposed opposed to the single crystal silicon substrate 7. Between the transparent glass substrate 1 and the single crystal silicon substrate 7, a liquid crystal is enclosed to form a liquid crystal layer 3. Light is incident from the side of the transparent glass substrate 1. The liquid crystal layer 3 is produced by mixing 2-ethylhexylacrylate (monomer), urethan acrylate oligomer, and E-8 (liquid crystal) at a ratio of 16:24:60, and uniformly mixing the obtained mixture with a photo polymerization initiator, and radiating with an ultraviolet ray. In short, the liquid crystal layer 3 is a complex of an organic polymer and a liquid crystal material.

According to the present invention, by using such a complex for the liquid crystal layer, light scattering is controlled by the cooperative functions of the liquid crystal material and the polymer instead of controlling the twisted angle as in the TN mode. Accordingly, a bright display image is obtained without using a polarizing plate, and a high-speed response is realized.

Moreover, owing to the use of the single crystal silicon substrate, the technologies used for ICs can be applied to the LCD device. Namely, highly advanced technologies for fine pattern lithographic processing, high quality thin film forming, high precision impurity introducing, crystal defect controlling, circuit designing and CAD can be used. By using the microscopic processing technology for the ICs, the pixels can be microscopic. As a result, a high precision LCD device can be realized.

EXAMPLE 2

Figure 6:
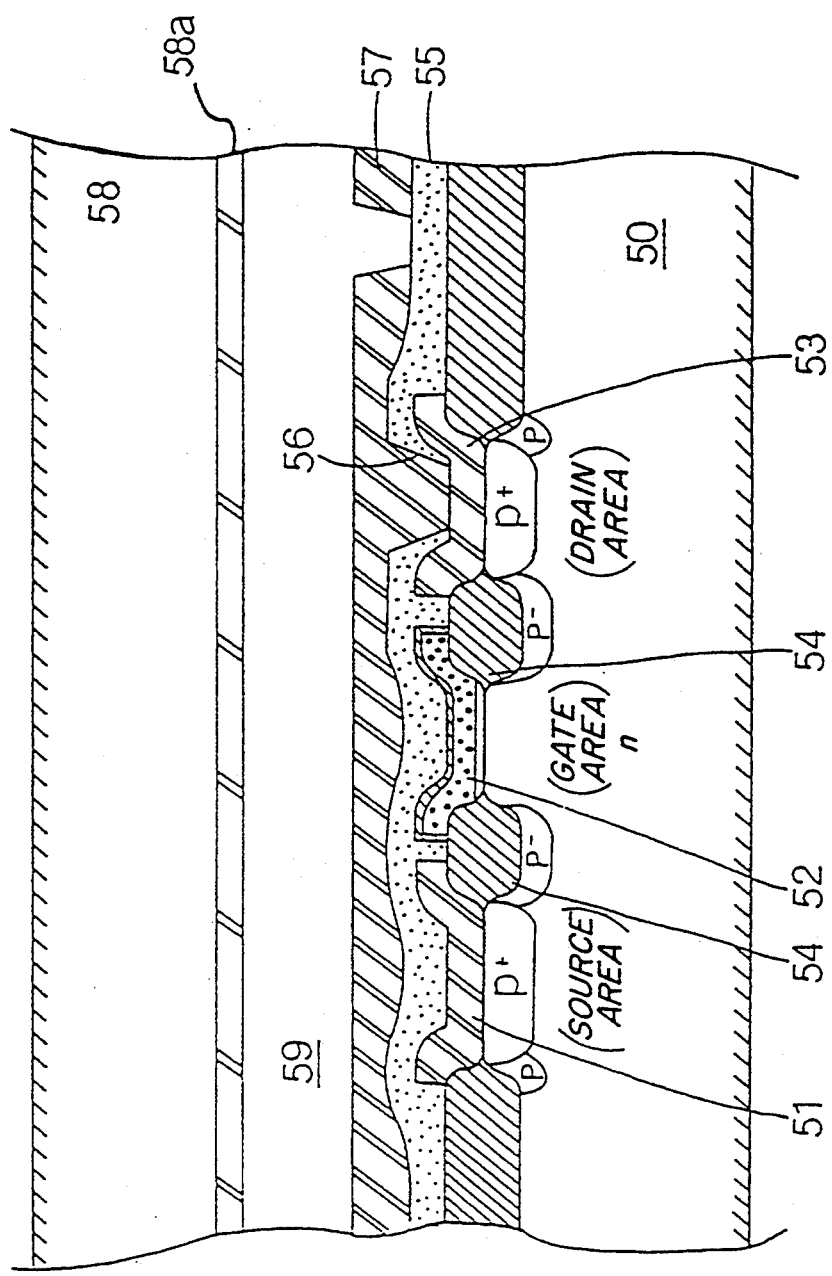
FIG. 6 is a view showing a construction of a reflection liquid crystal display device according to a second example of the present invention.

FIG. 6 is a cross sectional view of an LCD device according to the second example of the present invention. The LCD device includes a PMOS transistor having a high breakdown voltage as the switching device.

The MOS transistor according to this example has a relatively thick oxide film 54 between a source electrode 51 and a gate electrode 52 and between the gate electrode 52 and a drain electrode 53, and a low density p-type impurity diffusion area (indicated by "p−"; referred to as the "p− area", hereinafter) in an area below the relatively thick oxide film 54. The relative thick oxide film 54 and the p− area alleviate the concentration of the electric field between the source area and the gate area and between the gate area and the drain area. As a result, the breakdown voltage between the source electrode 51 and the drain electrode 53 is increased, thereby enhancing the breakdown voltage of the MOS transistor. In the second example, a breakdown voltage of approximately 30 V was obtained by forming a p− area having a width of 2.5 μm. Generally, the electric field is easier to concentrate between the drain electrode 53 and the gate electrode 52 than between source electrode 51 and the gate electrode 52. Accordingly, it is more desirable to make a distance between the source electrode 51 and the gate electrode 52 shorter than a distance between the gate electrode 52 and the drain electrode 53, in which case, the transistor is more compact.

The transistor formed on a single crystal silicon substrate 50 is wholly covered with an insulation layer 55 formed of polyimide. The insulation layer 55 is made less rugged. The insulation layer 55 has an opening 56 in an area above the drain electrode 53, through which the drain electrode 53 is connected to a reflective electrode 57 formed of aluminum by sputtering. If necessary, a surface of the reflective electrode 57 is precisely rubbed after the surface is heat-treated to be smoothed as a mirror surface. Forming a mirror surface is desirable especially in a projection LCD device. In the direct vision LCD device, the surface of the reflective electrode 57 may be roughened by, for example, photoetching.

Although the PMOS transistor is formed using an n-silicon substrate in the second example, an NMOS transistor may be formed using a p-silicon substrate. Generally, an NMOS transistor allows a high-speed operation and therefore is more desirable than a PMOS transistor. The NMOS and PMOS transistors may be combined to be a CMOS circuit for the purpose of improving the driving method of the liquid crystal and lowering the power consumption. If necessary, the impurity may be diffused to an area other than the area shown in FIG. 6 in order to improve the performance of the circuit.

Although the gate electrode 52 is formed of polysilicon in the second example, other materials, for example, aluminum may be used. The insulation layer 55 between the switching transistor and the reflective electrode 57 may be formed of, for example, $Si_3N_4$, $SiO_2$, PSG, BPSG, or other materials which have an insulating function when being-coated. Alternatively, the insulation layer 55 may be formed by laminating some of these materials.

Although the surface of the reflective electrode 57 is precisely rubbed to smooth the surface thereof in the second example without rubbing the insulation layer 55 for reducing the production cost, the surface of the insulation layer 55 may be smoothed. The surface of the insulation layer 55 is smoothed by a processing method such as a combination of CVD (chemical vapor deposition) and dry etching or rubbing. In the case when the surface of the insulation layer 55 is rubbed, the surface of the reflective electrode 57 is easily smoothed. The surface of the reflective electrode 57 is formed of other materials than aluminum.

Since the transistor having the above construction is formed on the silicon substrate by an ordinary method of producing a MOS transistor, the explanation will not be given herein.

After the MOS transistor and the reflective electrode 57 are formed on the silicon substrate 50, the silicon substrate 50 and a glass substrate 58 having a counter electrode 58a are opposed to each other with a certain gap therebetween. The gap was filled with a liquid crystal layer 59, which is a complex of a polymer and a liquid crystal material. Usually in order to keep the gap between the silicon substrate 50 and the glass substrate 58 at a certain distance, glass beads each having a desirable diameter are scattered on a top surface of the silicon substrate 50, an adhesive agent is coated along the edge of the top surface of the silicon substrate 50, and the glass substrate 58 is adhered on the silicon substrate 50 with an appropriate pressure. According to this method, however, the transistor on the silicon substrate 50 is possibly destroyed by the beads when the pressure is applied. In the second example, therefore, the silicon substrate 50 and the glass substrate 58 are respectively fixed by suctioning on highly smooth flat plates having microscopic suction holes, thereby fixing the silicon substrate 50 and the glass substrate 58 on the flat plates. The flat plates are opposed to each other with a desirable gap therebetween. Then, the gap is filled with a liquid crystal layer 59, and an ultraviolet ray is radiated therethrough. After the polymer and the liquid crystal material of the liquid crystal layer 59 are completely polymerized, the suctioning is stopped, and the silicon substrate 50 and the glass substrate 58 having the liquid crystal layer 59 therebetween is separated from the flat plates. In this method, the silicon substrate 50 and the glass substrate 58 are adhered by the liquid crystal layer 59 with a sufficient adhering strength.

Although no adhesive agent is used in the second example, the silicon substrate 50 or the glass substrate 58 is coated with an adhesive agent to adhere the silicon substrate 50 and the glass substrate 58. The adhesive agent may include glass beads and the like having a sufficient diameter to keep a certain distance between the silicon substrate 50 and the glass substrate 58. In such a case, the adhering strength is improved.

The second example, in which a complex of a polymer and a liquid crystal material is used for the liquid crystal layer and single crystal silicon is used for the substrate, has the same effects as the first example.

EXAMPLE 3

Figure 7:
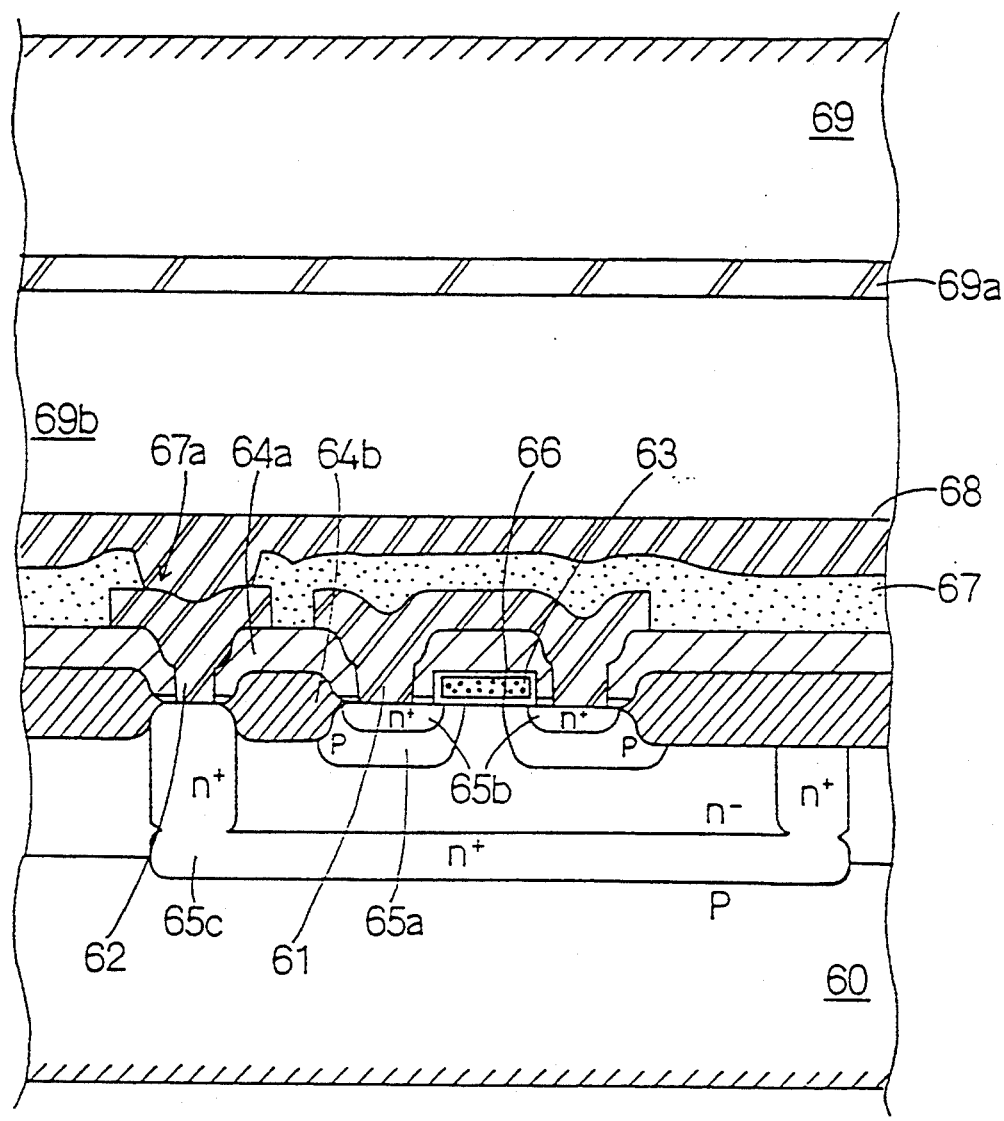
FIG. 7 is a view showing a construction of a reflection liquid crystal display device according to a third example of the present invention.

FIG. 7 is a cross sectional view of an LCD device according to a third example of the present invention.

The LCD device includes a vertical DSA (diffusion self aligned) MOS transistor having a high breakdown voltage as the switching circuit.

A DSAMOS transistor generally allows for high-speed operation and has a high breakdown voltage between the source electrode 61 and the drain electrode 62. In an ordinary MOS transistor, a fluctuation of characteristics thereof should be restricted in a certain range and it is difficult to reduce a channel length below a certain level due to an exposure process. On the other hand, in the case of a DSAMOS transistor, the channel area is determined by the impurity diffused from an identical window. Accordingly, the channel length is effectively reduced to realize a high-speed operation. The breakdown voltage between the source electrode 61 and the drain electrode 62 is determined by a distribution of the p-type impurity in the channel. The level of the p-type impurity is highest at an end of the source electrode 61 and is decreased in both transverse and depth directions. Therefore, the electric field is not concentrated in the drain area, thereby improving the breakdown voltage.

As shown in FIG. 7, an n+ area 65c is formed on a p-type single crystal silicon substrate 60. On the n+ area 65c, an n− layer is formed by epitaxial growth. On the n− layer, a gate electrode 63 is formed, and the source electrode 61 and a drain electrode 62 are separated by insulation layers 64a and 64b. In the source electrode 61, a P diffusion area 65a and an n+ diffusion area 65b are diffused from an identical window. In the case when a voltage of a threshold level or higher is applied to the gate electrode 63, the P diffusion area 65a below the gate insulation layer 66 is inverted to n-type, thereby the n+ diffusion area 65b below the source electrode 61 and the n+ area 65c below the drain electrode 62 are short-circuited. The source electrode 61 has a sufficient area in order to avoid a concentration of the electric field. The drain is the n+ diffusion area 65c formed by burying bottom portion of the n− layer and is connected through the n+ area diffused below the drain electrode 62.

The transistor formed on a single crystal silicon substrate 60 is wholly covered with an insulation layer 67 formed of polyimide. The insulation layer 67 is made less rugged. The insulation layer 67 has a throughhole 67a on an area above the drain electrode 62, through which the drain electrode 62 is connected to a reflective electrode 68 formed of aluminum by sputtering. If necessary, a surface of the reflective electrode 68 is precisely rubbed after the surface is heat-treated to be smoothed as a mirror surface. Forming a mirror surface is desirable especially in a projection LCD device. In the direct vision LCD device, the surface of the reflective electrode 68 may be roughened by, for example, photo-etching.

Although the vertical DSAMOS transistor is used in the third example, a conventional DSAMOS transistor may be used. In this case, it is difficult to simultaneously produce a bipolar transistor, but the number of processes is reduced, thereby decreasing the manufacturing cost.

Although the gate electrode 63 is formed of polysilicon in the third example, other materials, for example, aluminum may be used. The insulation layer 67 between the switching transistor and the reflective electrode 68 may be formed of, for example, $Si_3N_4$, $SiO_2$, PSG, BPSG, other materials which have an insulating function when being coated. Alternatively, the insulation layer 67 may be formed by laminating some of these materials.

Although the surface of the reflective electrode 68 is precisely rubbed to smooth the surface thereof in the third example without rubbing the insulation layer 67 for reducing the production cost, the surface of the insulation layer 67 may be smoothed. The surface of the insulation layer 67 is smoothed by a processing method such as a combination of CVD (chemical vapor deposition) and dry etching or rubbing. In the case when the surface of the insulation layer 67 is rubbed, the surface of the reflective electrode 68 is easily smoothed. Although the surface of the reflective electrode 68 is formed of aluminum in this example, other materials may be used.

After the MOS transistor and the reflective electrode 68 are formed on the silicon substrate 60, the silicon substrate 60 and a glass substrate 69 having a counter electrode 69a are opposed to each other with a certain gap therebetween. The gap is filled with a liquid crystal layer 69b, which is a complex of a polymer and a liquid crystal material. Usually in order to keep the gap between the silicon substrate 56 and the glass substrate 69 at a certain distance, glass beads each having a desirable diameter are scattered on a top surface of the silicon substrate 50, an adhesive agent is coated along the edge of the top surface of the silicon substrate 60, and the glass substrate 69 is adhered on the silicon substrate 60 with an appropriate pressure. According to this method, however, the transistor on the silicon substrate 60 is possibly destroyed by the beads when the pressure is applied. In the third example, therefore, the silicon substrate 60 and the glass substrate 69 are respectively fixed by suctioning on highly smooth flat plates having microscopic suction holes, thereby fixing the silicon substrate 60 and the glass substrate 69 on the flat plates. The flat plates are opposed to each other with a desirable gap therebetween. Then, the gap is filled with a liquid crystal layer 69b, and an ultraviolet ray is radiated therethrough. After the polymer and the liquid crystal material of the liquid crystal layer 69b are completely polymerized, the suctioning is stopped, and the silicon substrate 60 and the glass substrate 69 having the liquid crystal layer 69b therebetween is separated from the flat plates. In this method, the silicon substrate 60 and the glass substrate 69 are adhered by the liquid crystal layer 69b with a sufficient adhering strength.

The third example, in which a complex of a polymer and a liquid crystal material is used for the liquid crystal layer and single crystal silicon is used for the substrate, has the same effects as the first and the second examples.

In the first, second and the third examples, the liquid crystal layer is formed by mixing ethylhexylacrylate (monomer) and urethan acrylate olygomer and E-8 (liquid crystal) with a ratio of 16:24:60. A different composition ratio, for example, 16:4:80, also realizes a satisfactory liquid crystal layer. Other materials, for example, a mixed liquid of an acrylate ultraviolet-polymerizable composite and a nematic liquid crystal, practically, PN-001, PN-005, or the like produced by Dainippon Ink & Chemicals Inc. may be used. Alternatively, composites described in Y. Hirai, S. Niiyama, H. Kumai, and T. Gunjima, "Phase Diagram and Phase Separation in LC/Prepolymer Mixture", proceeding of SPIE, vol. 257, pages 2–8, 1990 may be used. The above-mentioned materials are each uniformly mixed with the photo polymerization initiator and then exposed to ultraviolet radiation.

Still other composites may be used for the liquid crystal layer. The complexes of a polymer and a liquid crystal material include NCAP (nematic curvilinear aligned phase), PLDC (polymer dispersed liquid crystals), PNLC (polymer network liquid crystals), and LCPC (liquid crystals and polymer composite). Proposed as a method for producing the above composites are applying a technology for producing a microcapsule; curing a uniform solution of a liquid crystal and a polymerizable compound by an ultraviolet ray or a heat energy; vaporizing a common solvent from a uniform solution of a liquid crystal, a polymer and the common solvent; cooling a uniform solution of a heat-melted liquid crystal and a heat-curing resin; and impregnating a sponge-like cellulose film or microscopic glass particles with a liquid crystal.

A mode in which a microcapsuled liquid crystal is diffused in the polymer and light scattering caused by the difference of the refractive index on an interface between the liquid crystal material and the polymer is utilized is mentioned in, for example, SID int. Symp. Digest. tech., 16, 68, 1985. A mode in which a liquid crystal forms a continuous phase in a mesh of polymer and light scattering caused by the cooperative effect of the liquid crystal and the polymer is utilized is mentioned in, for example, Proc. of Japan Display '89, 690 (1989).

The liquid crystal layers are significantly different in such important characteristics as the speed of response and the driving voltage, depending on the polymerization conditions. In order to obtain a liquid crystal layer having desirable characteristics, the polymerization conditions should be precisely controlled. Generally, the conditions of polymerization by thermal energy are more difficult to control than the conditions of photo polymerization. Since precise control of the photoelectric characteristics of the liquid crystal layer is especially critical, it is desirable to employ photo polymerization.

As mentioned above, a single crystal silicon substrate is used in the above examples. The electric field mobility of single crystal silicon is approximately 1,900 $cm^2V^{-1}S^{-1}$ in $\mu_e$ and approximately 420 $cm^2V^{-1}S^{-1}$ in $\mu_h$. Such excellent electric field mobility is realized by a high crystallinity of the single crystal silicon. Namely, substantially no trap, which is caused by a crystal defect, is existent in the crystal of the single crystal silicon. A p-n junction which is formed in ideal conditions have substantially no leak current. For this reason, a small transistor can be formed on the substrate. It is generally known that a smaller transistor or a shorter wiring reduces a parasitic capacitance accompanying the operation of the transistor, thereby improving an operating frequency of the IC. Practically, in the case that the minimum processing line width of the IC is 1 $\mu m$, the operating frequency of a CMOS transistor is approximately 200 MHz to 2 GHz. This value is sufficient for a driving circuit of an LCD device for driving 2,000×2,000 pixels at 60 Hz.

The use of a single crystal silicon substrate allows the utilization of a great many kinds of devices, circuit technologies, and microscopic processing technologies which have been conventionally used in ICs. For example, a MOS transistor can be designed in accordance with the operating speed and the breakdown voltage. Other usable devices include NMOS, PMOS, CMOS (complementary MOS; combination of NMOS and PMOS), MOS having a high breakdown voltage, DSAMOS, DRAM (dynamic random access memory), SRAM (static random access memory), pseudo SRAM, PROM (programmable read only memory), EPROM (erasable programmable read only memory), EEPROM (electrical EPROM), flash EEPROM, Mask ROM, bipolar transistor, IIL (integrated injection logic), ECL (emitter coupled logic), Schottkey diode, CCD (charge couples device), capacitor, resistor, photodiode, and phototransistor. A semiconductor utilizing the single crystal silicon is described in detail in S. M. Sze, "Physics and Technology of Semiconductor Devices", John Wiley & Sons (1969) and A. G. Grove, "Physics and Technology of Semiconductor Devices", John Wiley & Sons (1967). The devices mentioned in these publications can be used.

The usable circuits include logic circuits such as various memory circuits, a microprocessor, a gate array, and a driver, a CCD circuit, a BiMOS circuit (combination of a bipolar transistor and a MOS transistor, a TTL (transistor transistor logic) circuit, an ECL circuit and an IIL circuit. The MOS circuit is described in detail in William N. Carr, Jack P. Mize, "MOS/LSI Design and Application". The circuits mentioned in this publication can be used. The analog circuit is described in detail in A. B. Grebene, "Analog Integrated Circuit Design", Litton Educational Publishing (1972). The devices and circuits mentioned in this publication can be used. The materials and the processing technologies used for ICs are described in detail in Kazuo Maeda, "Saishin LSI Process Gijutsu (Advanced LSI Processing Technology)", Kogyo Chosakai Publishing Co., Ltd. (1983). The materials and the processing technologies mentioned in this publication can be used.

The use of a single crystal silicon substrate solves the aforementioned problems of the TAB and COG methods as will be described hereinafter.

(1) Due to the identical coefficient of thermal expansion of an IC chip and a silicon substrate, no thermal stress is generated. Accordingly, there is no problem concerning reliability. An IC chip was connected to a silicon substrate according to the above examples to produce an LCD device. The temperature of the LCD device was kept at −55° C. for approximately 30 minutes and then raised to 125° C. and kept for 30 minutes. The above process was repeated 1,000 times. The connecting terminal was not cracked.

(2) Owing to no thermal stress, a sealing resin is not required between the IC chip and the substrate. Accordingly, the thickness of the IC chip can be reduced, realizing a small connecting section having a higher wiring density.

(3) Since the wiring can be formed using the microscopic technologies used for ICs, the line width of the wiring can be small. A wiring having a width of 1 $\mu m$ or less can stably be formed. Further, aluminum, molybdenum and titanium which are generally used for producing ICs can be used for connection. The improved wiring density allows an increase of the number of the connecting terminals formed on the IC chip. Although the connecting terminals are usually formed only on a peripheral portion of the IC chip in the COG method, the connecting terminals can be formed on other portions in the case where the substrate is formed of single crystal silicon owing to no generation of thermal stress. This results in a significant improvement of the wiring density.

(4) In the case when the IC chip is connected to the glass substrate, the long wiring undesirably increases the parasitic capacitance of the wiring, thereby lowering the signal transmission speed from the IC chip to the substrate. Accordingly, it is desirable that the wiring is as short as possible. However, the ITO terminal on the glass substrate cannot be thin and the connecting terminal according to the COG method makes it difficult to raise the wiring density, resulting in a long wiring. In the case when the single crystal silicon substrate is used, the microscopic processing technologies for ICs can be used and the connecting terminals of the IC chip can be small. These two advantages raises the wiring density to significantly shorten the wiring. Accordingly, there is no problem of the signal transmission speed, which allows the use of a high speed IC. Practically, while the IC connected to a glass substrate has an operating frequency of approximately 8 MHz, the IC connected to a single crystal silicon substrate having an optimum wiring design for minimizing the wiring length has an operating frequency of up to 100 MHz. Accordingly, the high speed of the IC is fully utilized, thereby realizing a high precision, high density LCD device. To the single crystal silicon substrate, a variety of IC chips including a CPU (central processing unit) and memory devices can be connected without lowering the performance level of the IC chip.

Figure 8A:
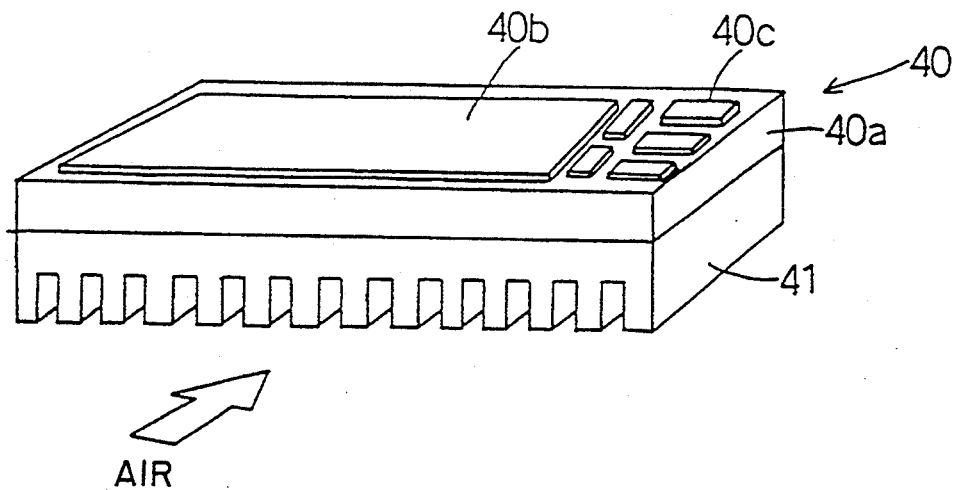
FIG. 8a is a view illustrating a liquid crystal display device cooled by air.
Figure 8B:
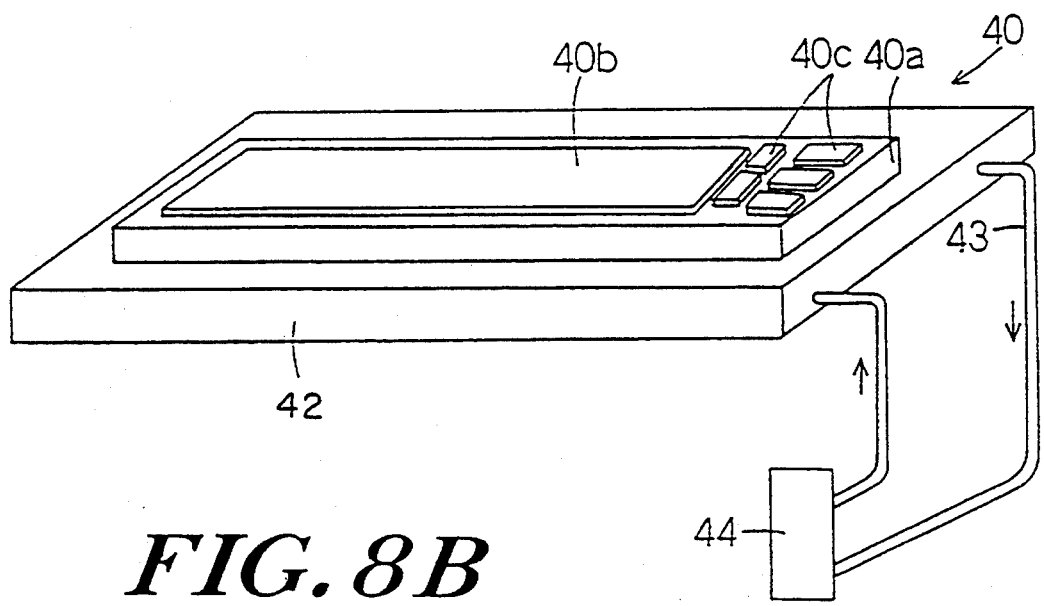
FIG. 8b is a view illustrating a liquid crystal display device cooled by water.

(5) Single crystal silicon has a coefficient of thermal conductivity of approximately 123 W/m·K, which is higher than that of glass (approximately 1.2 W/m·K) by two digits. Since the heat generated on an upper surface of the single crystal silicon substrate is easily conducted to a lower surface thereof, heat can be radiated from the lower surface. The heat generated in the IC chip can be radiated through the single crystal silicon substrate. FIGS. 8a and 8b illustrate methods for cooling the LCD device according to the present invention. In FIG. 8a, an LCD device 40 is cooled by air. The LCD device 40 has a display section 40b and an IC chip 40C on a single crystal silicon substrate 40a. A flat plate 41 having heat radiating fins is adhered on a lower surface of the single crystal silicon substrate 40a. The flat plate 41 is formed of a material having a high heat conductivity such as aluminum or copper. In FIG. 8b, the LCD device 40 is cooled by water. A cooling plate 42 cooled by a cooling tube 43 connected thereto is adhered on the lower surface of the single crystal silicon substrate 40a. Flowing in the cooling tube 43 is a liquid cooled by a cooling unit 44. As the liquid, water or a cooled liquid mixed with a preservative is usually employed. Owing to a satisfactory heat conductivity of the single crystal silicon substrate 40a, the LCD device 40 was efficiently cooled in either case. Such efficient cooling is especially important in a projection LCD device, the temperature of which is significantly increased by a high intensity light emitted on a liquid crystal display panel.

Figure 9:
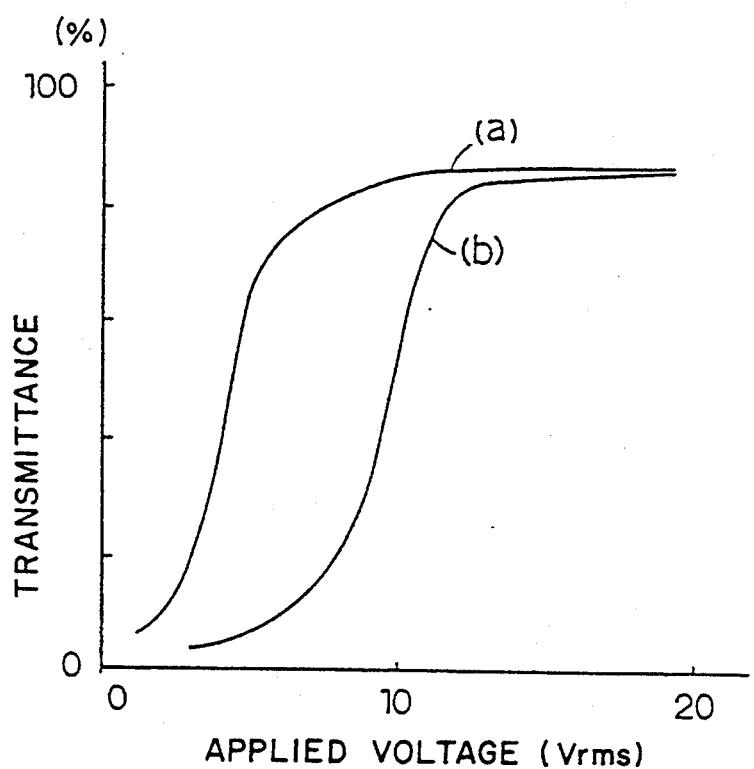
FIG. 9 is a graph showing the relationship between the voltage and the transmittance.
Figure 10:
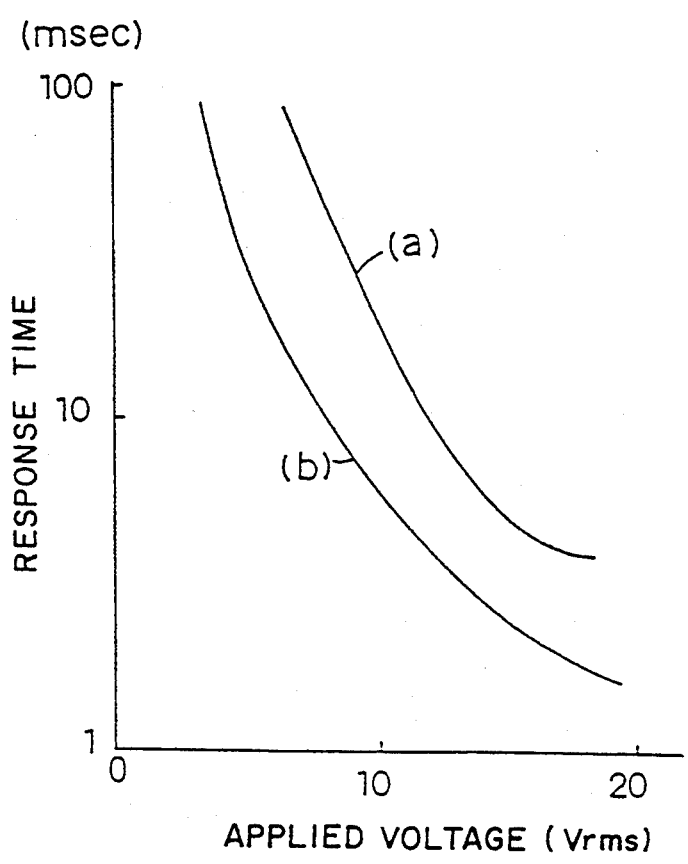
FIG. 10 is a graph showing the relationship between the voltage and the response time.

An LCD device having a single crystal silicon substrate can be applied in a broader area when the liquid crystal layer is formed of a complex of an organic polymer and a liquid crystal material. Conventionally, a complex of a liquid crystal material and an organic polymer requires a high voltage for ON/OFF switching. In an effort to solve this inconvenience, the structure and size of the mesh of the organic polymer have been optimized. FIG. 9 shows a relationship between the voltage applied to two kinds of liquid crystal layers and the transmittance thereof. The liquid crystal layers indicated by lines (a) and (b) have an identical composition but include a polymer with different conditions of polymerization. The liquid crystal layer indicated by the line (a) is obtained by slow polymerization with a low energy level of ultraviolet radiation, and the liquid crystal layer indicated by the line (b) is obtained by quick polymerization with a high energy level of ultraviolet radiation. The liquid crystal layer indicated by the line (a) is switched by a lower voltage. FIG. 10 shows a relationship between the voltage applied to the above two liquid crystal layers and the response time thereof. The response time was measured from the time the transmittance was 10% until the time the transmittance was 90% after an ON signal was sent to each liquid crystal layers. The lower the applied voltage is, the longer the response time is. The liquid crystal layer indicated by the line (a) shows a longer response time than that indicated by the line (b) for an identical voltage. These results indicate that a reduction of the voltage and a decrease of the response time are in an opposite relationship to each other. High speed switching requires an increase of the voltage. In the case where a high operating speed is not necessary, the LCD device can be driven by a low voltage. Therefore, a microscopic transistor utilizing the most advanced processing technologies can be used as a switching transistor in such a case. Accordingly, a switching circuit including a plurality of transistors and capacitors can be formed. Such a switching circuit solves the problems of the leak current and a short voltage holding time of the liquid crystal. The above problems are caused by the fact that the relative resistance of the liquid crystal layer which is a complex of a liquid crystal material and a polymer is only approximately $10^{10}$ Ωcm, which is smaller than that of an ordinary twisted nematic liquid crystal by two digits.

Figure 11:
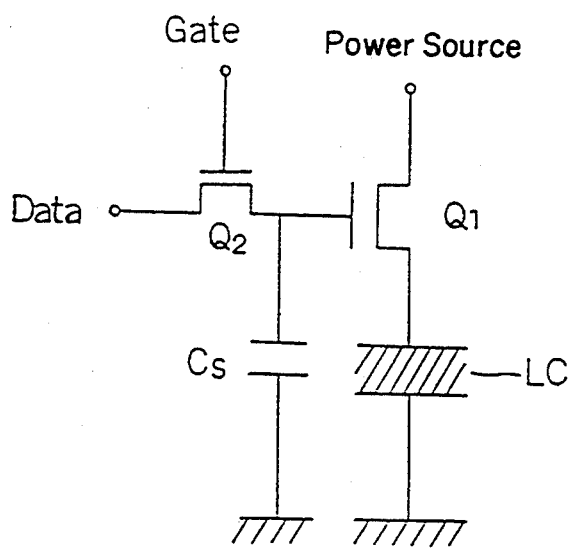
FIG. 11 is a diagram of a switching circuit for a low-resistance liquid crystal device.

FIG. 11 shows an example of the switching circuit for driving the liquid crystal. $Q_1$ refers to a transistor for applying a voltage to the liquid crystal. As the transistor $Q_1$, a transistor which has a substantially linear relationship with a gate potential and a drain potential is desirably used. Since the voltage is directly applied to the liquid crystal, the breakdown voltage should be sufficiently high for switching the liquid crystal. $Q_2$ refers to a transistor for supplying a data signal to the transistor $Q_1$. The transistor $Q_2$ desirably has a low leak current in the off state. LC refers to a capacitance of the liquid crystal, and Cs refers to an auxiliary capacitance for holding the data signal of the transistor $Q_1$. When a data line receives a data signal and a gate line is applied with a voltage to turn on the transistor $Q_2$, the data signal is applied to the transistor $Q_1$. Simultaneously, the data signal is held in the auxiliary capacitance Cs. In the case when a power line is applied with a sufficient voltage to drive the liquid crystal, the transistor $Q_1$ applies a voltage corresponding to the data signal to the liquid crystal, thereby switching the liquid crystal.

In the case where a single crystal silicon substrate is used, a circuit including a plurality of transistors and capacitors can be produced. Accordingly, even in the case where the liquid crystal has a low resistance, satisfactory display quality is obtained. The circuit shown in FIG. 11 can be varied by adding transistors and other devices.

In the case when a high voltage is required for switching the liquid crystal, a MOS transistor having a high breakdown voltage or a bipolar transistor is used.

By using a single crystal silicon substrate, the conventional problems associated with the use of the liquid crystal layer which is formed of a complex of a polymer and a liquid crystal material are solved, and further a high-speed and highly reliable LCD device can be realized.

In the conventional LCD device, the switching circuit includes one or a plurality of TFTs and a compensating capacitor. Therefore, a liquid crystal having a low resistance cannot be used. According to the present invention, since a switching circuit can be produced in various types in accordance with the characteristics of the liquid crystal such as the resistance and the switching voltage, various types of liquid crystal layers can be used. Since the switching circuit can be formed on a substrate formed of single crystal silicon, by which light is reflected, the effective display area is not reduced.

In addition to the switching circuit, a driving circuit, a logic circuit, a memory circuit and the like can be formed on the same substrate. Therefore, a logic function can be added to the LCD device. Moreover, the production of the LCD device hardly requires additional equipment in a clean room of an IC production plant, which reduces manufacturing cost.

Hereinafter, practical uses of the LCD device according to the present invention and LCD systems using the LCD device according to the present invention will be described.

EXAMPLE 4

A compact reflection LCD device according to the present invention is usable in a High Definition Television system. In such an LCD device, the size of pixels is reduced using the microscopic processing technology which is conventionally used for ICs. For example, in the case when the pixel pitch is $20 \times 25$ $\mu m^2$ (vertical length $\times$ horizontal length) and the number of the pixels is $1,000 \times 1,400$, an LCD device having a display size of $20 \times 35$ $mm^2$ and 1.6 inches across is obtained. Since a driving circuit is required to be integratedly formed on a peripheral surface of a display plane, a practical size of the single crystal silicon substrate is $30 \times 45$ $mm^2$. The liquid crystal layer is obtained by mixing 2-ethylhexylacrylate (monomer), urethan acrylate olygomer, and E-8 (liquid crystal) with a ratio of 16:24:60, uniformly mixing the obtained mixture with a photo polymerization initiator, and radiating an ultraviolet ray therethrough.

Figure 13:
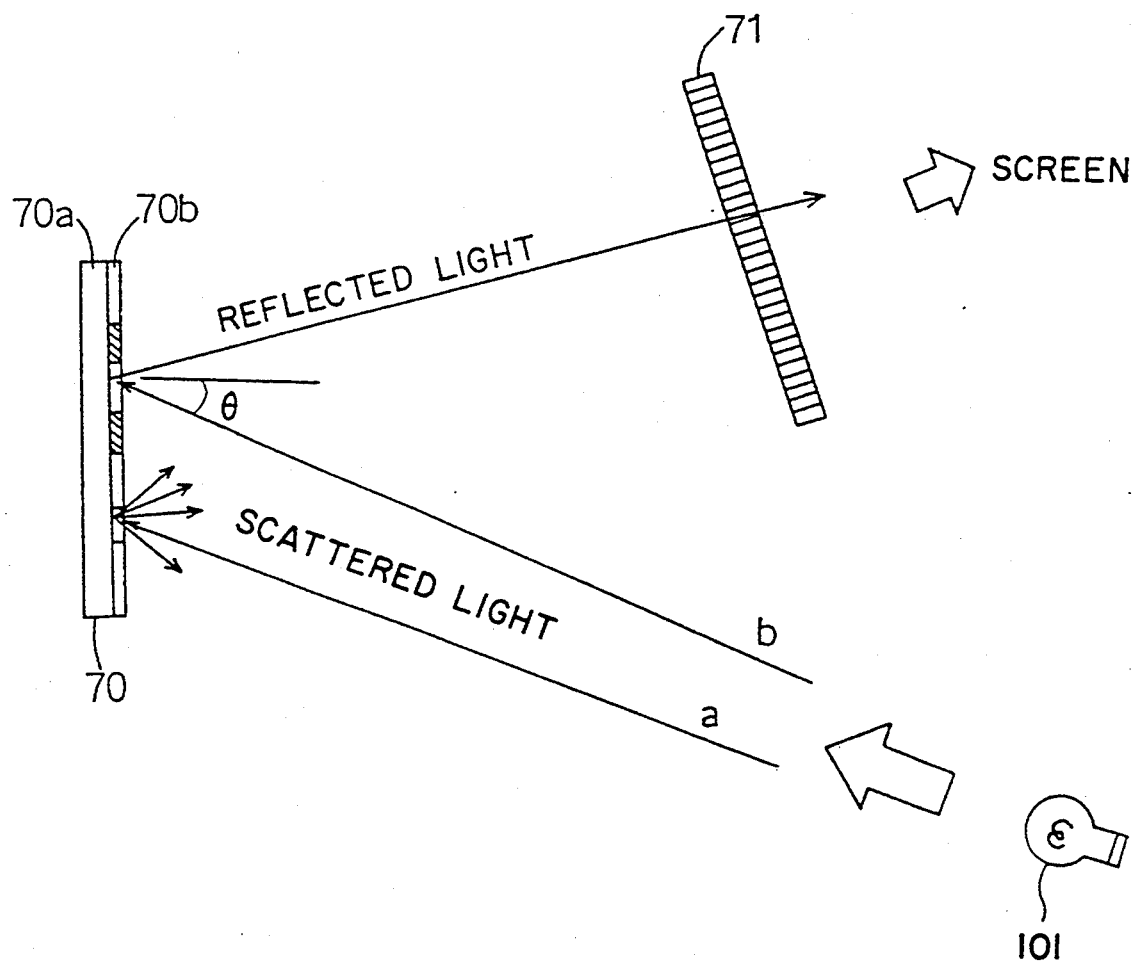
FIG. 13 is a conceptual view of a projection liquid crystal display system using a liquid crystal display device according to the present invention.

Such an LCD device can be used in an LCD system as is shown in FIG. 13.

Figure 1A:
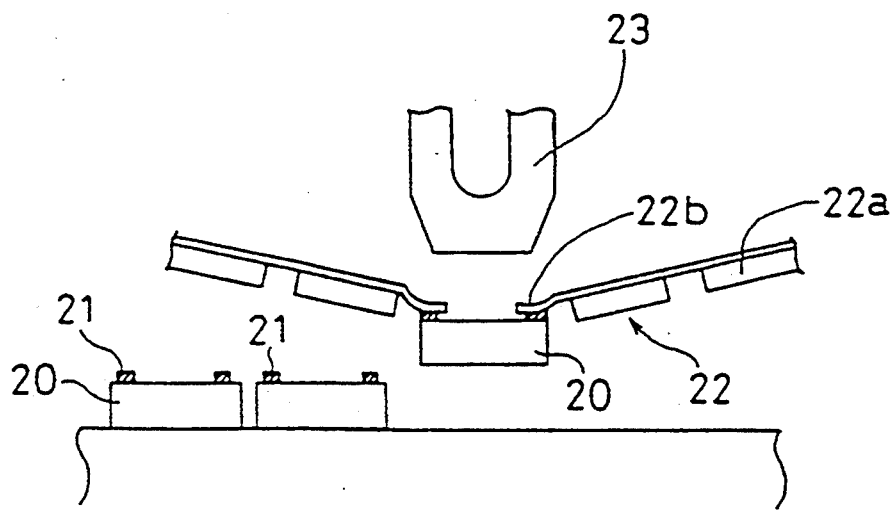
FIGS. 1a to 1c are views illustrating a TAB method for connecting an IC chip to a substrate.
Figure 1B:
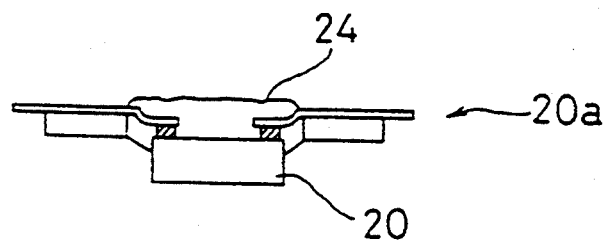
Figure 1C:
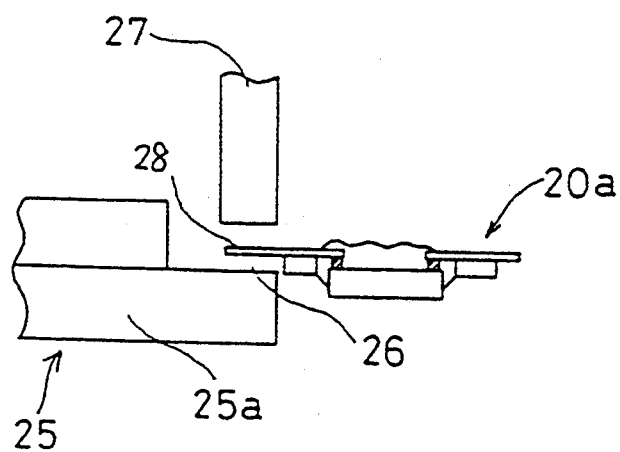
Figure 2A:
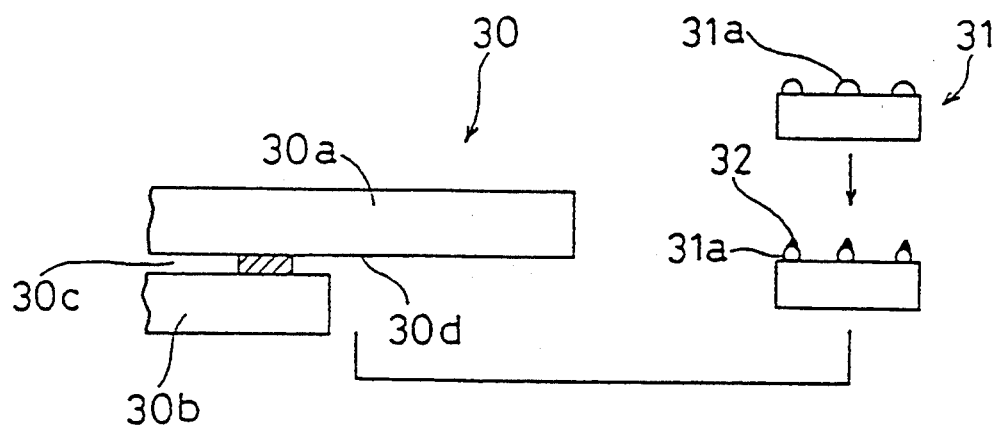
FIGS. 2a to 2d are views illustrating a COG method for connecting an IC chip to a substrate.
Figure 2B:
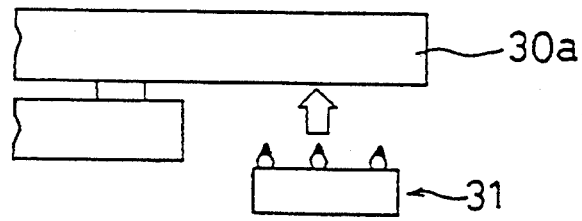
Figure 2C:
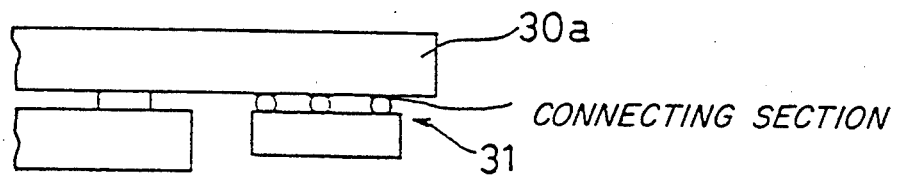
Figure 2D:
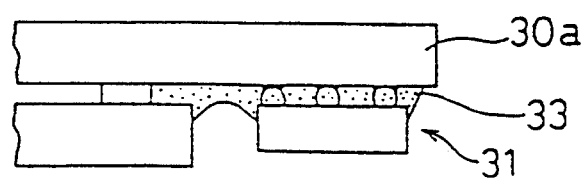
Figure 3:
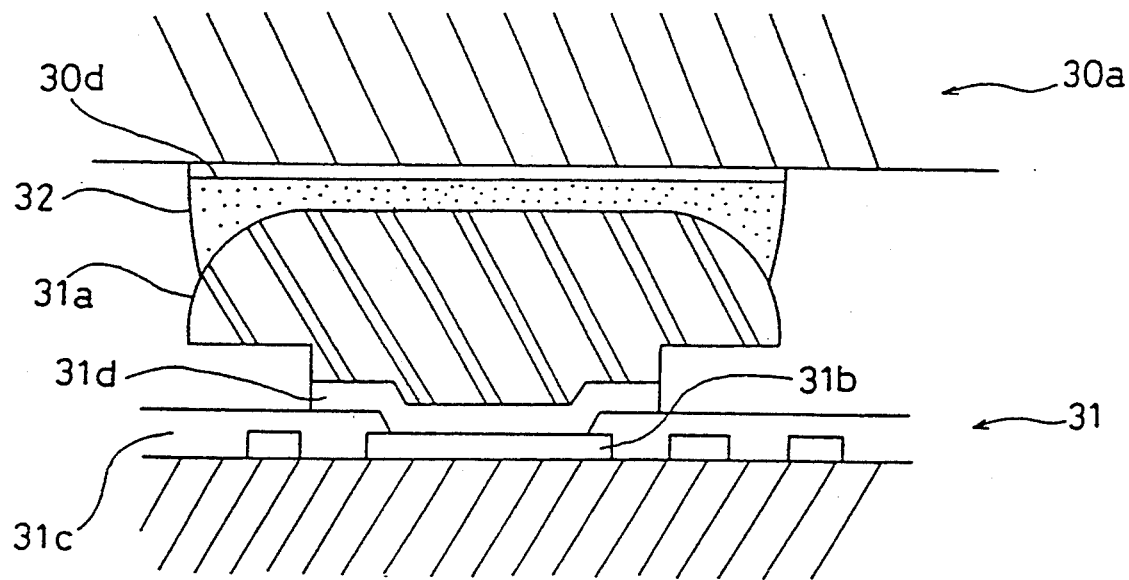
FIG. 3 is a cross sectional view of a connecting section according to the COG method.
Figure 12A:
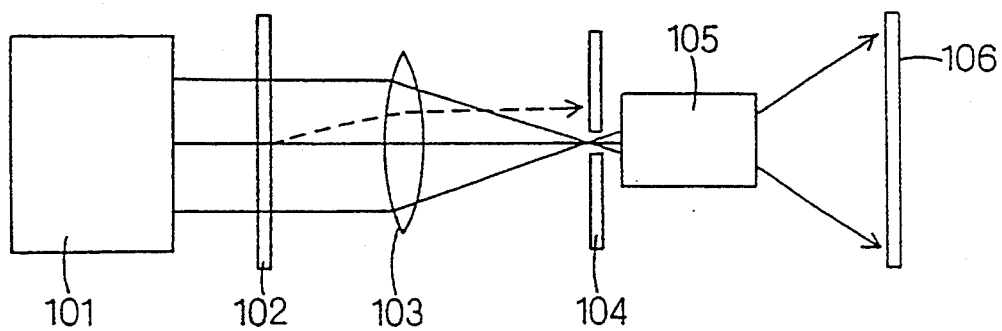
FIG. 12a is a conceptual view of a conventional projection liquid crystal display system.
Figure 12B:
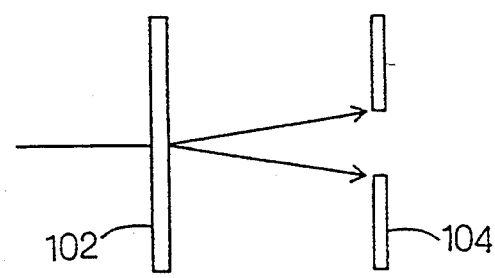
Figure 4A:
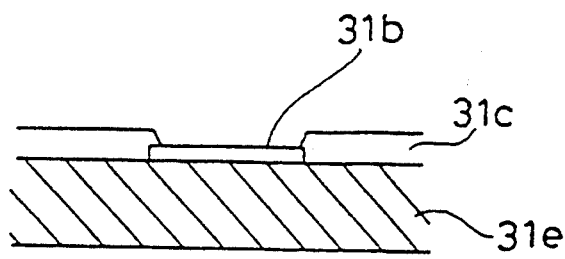
FIGS. 4a to 4e are views illustrating a process of the COG method.
Figure 4B:
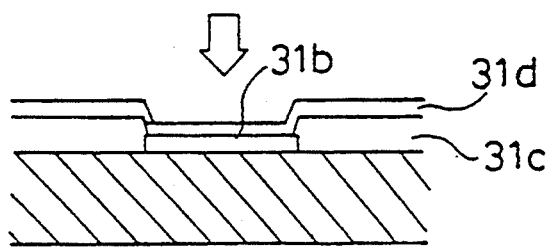
Figure 4C:
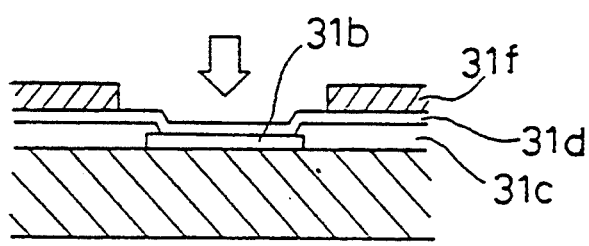
Figure 4D:
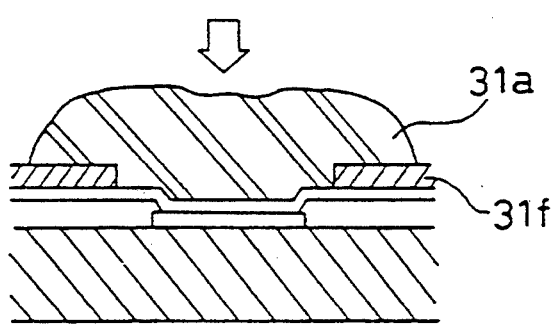
Figure 4E:
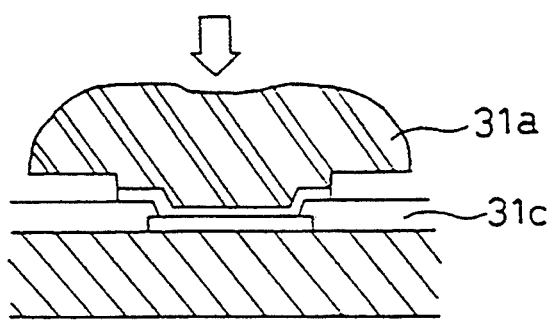

For comparison, FIG. 12a shows a conventional LCD system. The conventional LCD device includes a light source 101, an LCD device 102, an optical lens 103, an optical aperture 104, a lens 105 and a screen 106. In order to avoid the light transmitted through the LCD device 102 from scattering as is shown in FIG. 12b, the highly precise lens 103 is required. In this case, a chromatic aberration is generated by the lens 103. In order to eliminate the chromatic aberration, an expensive lens having an aspheric surface is required. However, even if the lens having the aspheric surface is used, the chromatic aberration is not completely eliminated, and therefore, the aperture 104 should be opened to compensate for the dichroic aberration. When the aperture 104 is opened, the contrast is lowered. FIG. 13 shows the LCD system including the LCD device according to the present invention. As is shown in FIG. 13, an FOP (fiber optic plate) 71 is used instead of the optical lens 103 and the aperture 104. In this LCD system, an optical system and a projection optical system are required to make the light rays run in parallel. The explanation of these optical systems will be omitted for simplicity. An LCD device 70 includes a single crystal silicon substrate 70a and a glass substrate (not shown) opposed to each other with a uniform gap therebetween, and a liquid crystal 70b filling the gap. The single crystal silicon substrate 70a and the glass substrate are adhered with the liquid crystal 70b. The liquid crystal 70b is formed of an organic polymer formed in a mesh and a liquid crystal filling the meshes. The FOP 71 for cutting light scattered by the LCD device 70 is disposed between LCD device 70 and a projection screen in the manner such that the light projected on the screen is perpendicular to a surface of the screen.

Figure 14:
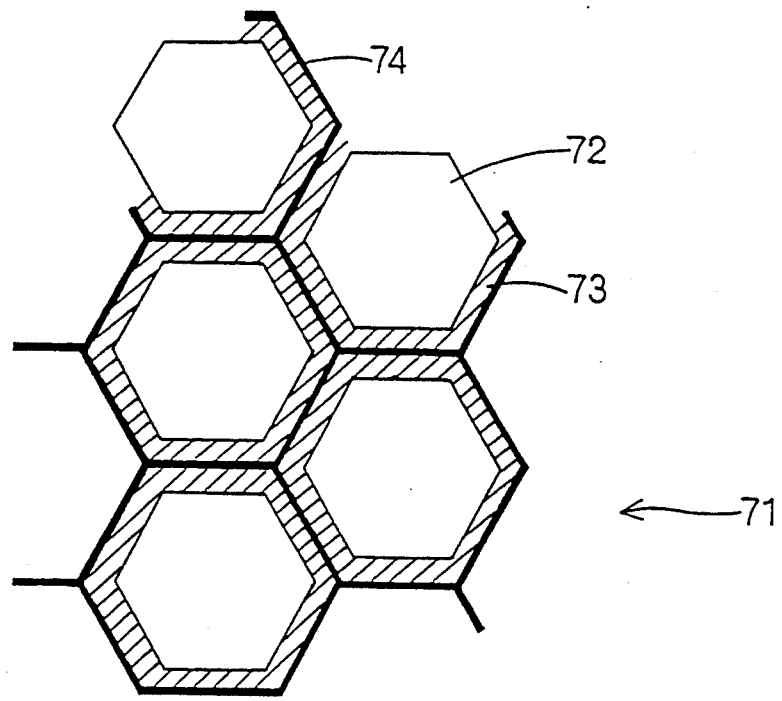
FIG. 14 is a cross sectional view of a fiber optic plate used in the system of FIG. 13.
Figure 15:
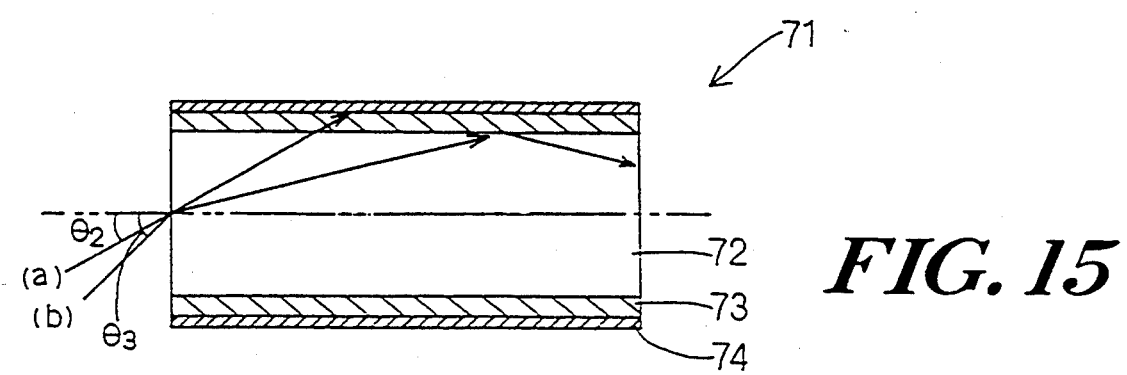
FIG. 15 is a view illustrating a principle of light propagation in the fiber optic plate of FIG. 14.

FIG. 14 is a cross sectional view of the FOP 71. The FOP 71 includes a core glass 72 and a clad glass 73 constituting a glass fiber, and a light absorber 74 interposed between the adjacent glass fibers.

Where the refractive index of the core glass 72 is $n_0$ and that of the clad glass 73 is $n_1$, the materials of the core glass 72 and the clad glass 73 are selected so that $n_0 > n_1$. As is shown in FIG. 15, in the case when light is incident on the core glass 72 with a small angle of incidence $\theta_2$, the light is propagated while being reflected by an interface between the core glass 72 and the clad glass 73 as indicated by (a). In the case when the light is incident on the core glass 72 with a large angle of incidence $\theta_3$, the light is transmitted through the clad glass 73 to be absorbed by the light absorber 74 without being reflected by the interface between core glass 72 and the clad glass 73 as indicated by (b). The maximum angle of incidence is small as the value of $n_0 - n_1$ is small. When $n_0 - n_1 = 0$, only the light perpendicularly incident on the FOP 71 is transmitted through the FOP 71. Accordingly, the FOP 71 functions as a satisfactory collimator lens.

In FIG. 13, the light incident on the LCD device 70 and the light reflected by the LCD device 70 are not in parallel but slightly inclined in order to avoid the light from the light source from being incident directly on the FOP 71. In this example, the angle of incidence is approximately 5°. The light incident on an area of the liquid crystal layer 70b which is not applied with a voltage as is indicated by (a) is scattered by the liquid crystal layer 70b. The light incident on an area of the liquid crystal layer 70b applied with a voltage as is indicated by (b) is reflected by a surface of the substrate 70a without being scattered by the liquid crystal layer 70b. In the case that the FOP 71 is provided between the LCD device 70 and the screen so that only the reflected light is transmitted and the scattered light is absorbed, only the reflected light reaches the screen. In this example, a color display having a contrast of 50 is obtained in a color display.

Since the use of the FOP eliminates the use of an expensive aspheric surface lens, the production cost of the LCD system is reduced.

Figure 19:
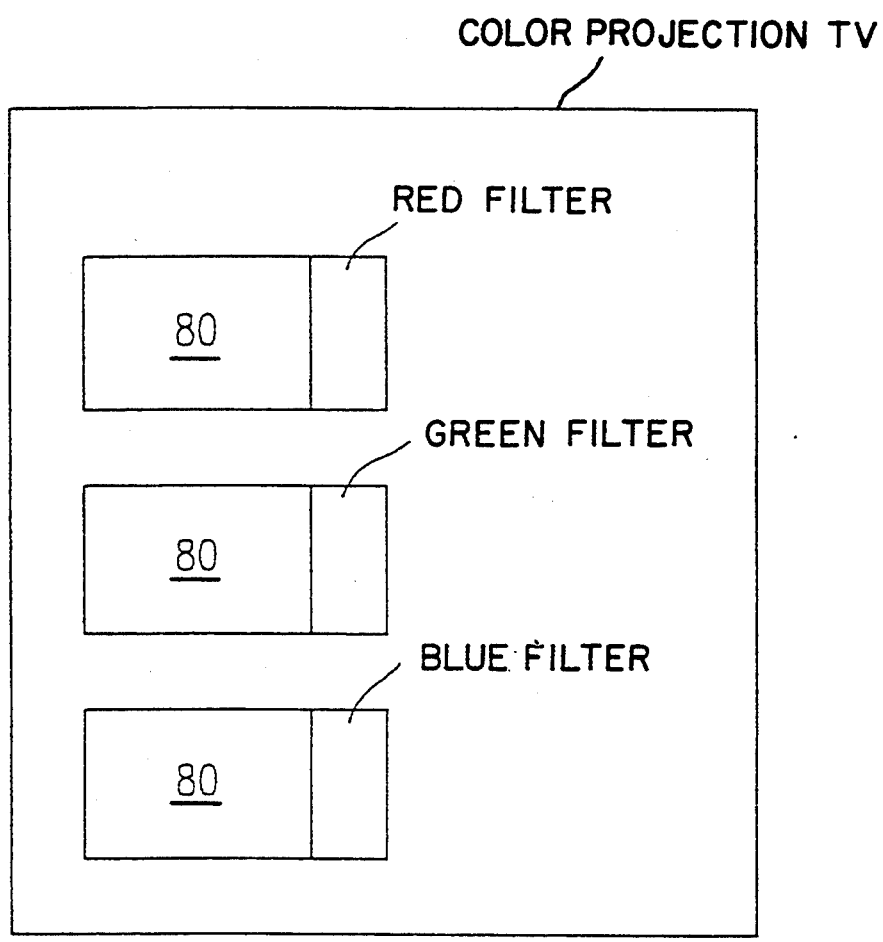
FIG. 19 is a view illustrating a color projection TV using liquid crystal display devices of this invention.

By using three of the LCD 80 devices according the present invention and also attaching red, green and blue filters to the three LCD devices respectively, a color projection TV is realized, as shown in FIG. 19. The obtained color projection TV has a bright display. Further, since the optical system can be compact owing to the compact LCD devices, the projection TV can be compact.

EXAMPLE 5

Figure 16:
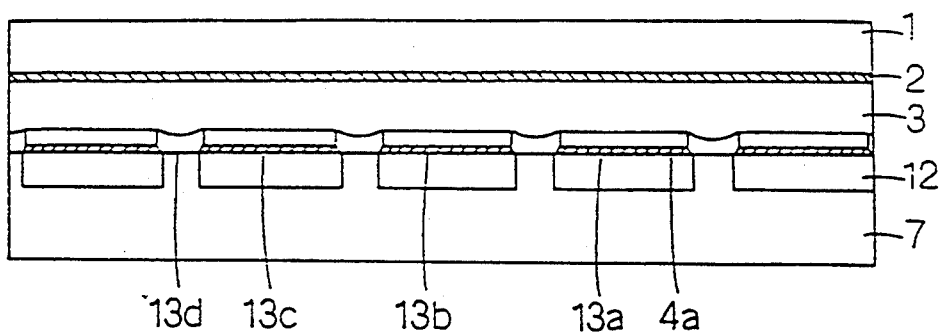
FIG. 16 is a cross sectional view of a color liquid crystal display device using a liquid crystal display device according to the present invention.

FIG. 16 is a cross sectional view of a reflection color LCD device. The identical members with those in FIG. 5 have the identical reference numerals. The reflection color LCD device is produced by dividing the pixels of the LCD device 70 into three portions and attaching red, green and blue filters to the three portions, respectively. The single crystal silicon substrate 7 has switching circuit areas 12 in an upper portion thereof. Each switching circuit area 12 has the reflective film 4a also functioning as the electrode. A surface of the single crystal silicon substrate 7 including the reflective film 4a is coated with the gelatin film. A portion of the gelatin film, the portion being formed on one of the switching circuit areas 12, is dyed red to act as a red filter 13a. Another portion of the gelatin film on another switching circuit area 12 is dyed green to act as a green filter 13b, and still another portion of the gelatin film on still another switching circuit area 12 is dyed blue to act as a blue filter 13c. The remaining portion of the gelatin film acts as an area 13d which is not dyed. Since a method for forming a gelatin film and a dying technology have already been developed for a CCD, which are used for the reflective color LCD device according to the present invention, this will not be explained.

The LCD device having the above construction is applied to an extremely compact projection TV and office automation apparatuses.

EXAMPLE 6

Figure 17:
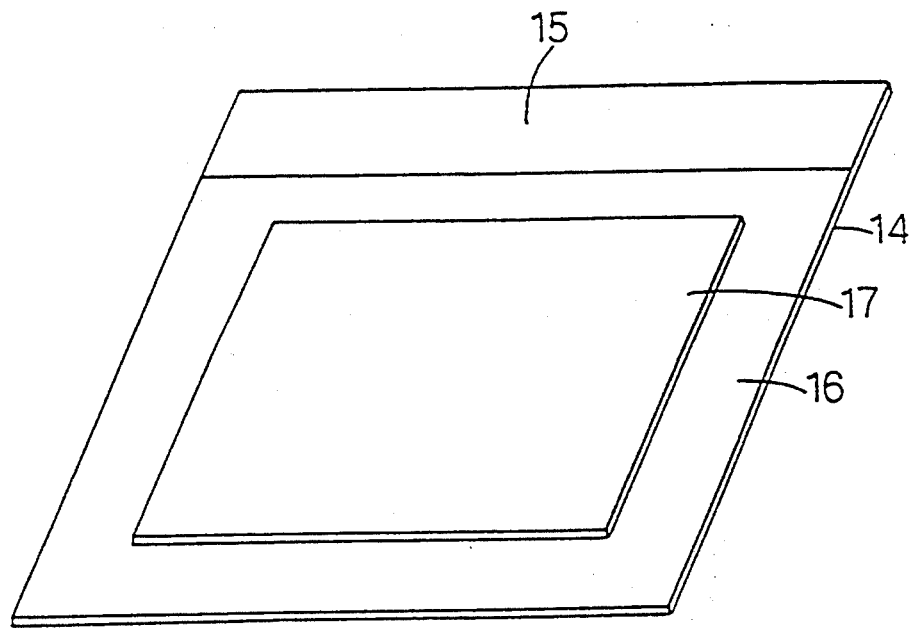
FIG. 17 is a perspective view of a liquid crystal display device having an image processing section mounted thereon.

FIG. 17 illustrates an LCD device 14 including an image processing section and a display section 17 mounted on a single crystal silicon substrate. The LCD device 14 has the display section 17 on a central portion thereof. The LCD device 14 also has a liquid crystal driving section 16 and a circuit section 15 on a peripheral portion thereof. The circuit section 15 includes a memory circuit and an image processing section. An input signal is processed by the memory circuit, the image processing circuit and the like, and then sent to the liquid crystal driving section 16 to display an image on the display section 17.

According to the above construction, the display section and the image processing section are integrated. The display section may be integrated with sections having other functions.

Figure 18:
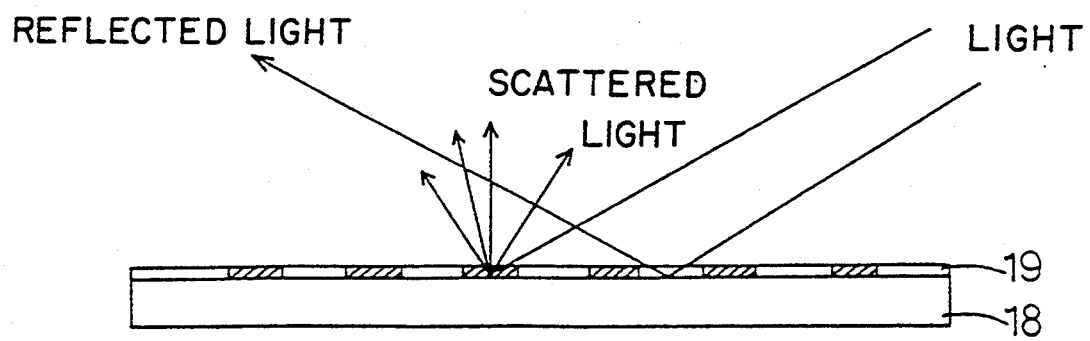
FIG. 18 is a view illustrating a display principle of a liquid crystal display device used in a direct vision liquid crystal display system.

The LCD device shown in FIG. 17 can be applied to a direct vision LCD system. FIG. 18 illustrates a display principle thereof. The LCD device includes a single crystal silicon substrate 18 which has a driving circuit, an image processing circuit and the like thereon, and a glass substrate (not shown) opposed to each other with a uniform gap therebetween, and a liquid crystal layer 19 filling the gap. The single crystal silicon substrate 18 and the glass substrate are adhered with the liquid crystal layer 19. The liquid crystal layer 19 is formed of an organic polymer formed in a mesh and a liquid crystal layer filling the meshes. In the case light is emitted in an inclined state with respect to the LCD device, the light is reflected by a surface of the single crystal silicon substrate 18 in an area of the liquid crystal layer 19 applied with a voltage. Accordingly, the observer does not catch such light. In an area of the liquid crystal layer 19 which is not applied with a voltage, the light is scattered by the liquid crystal layer 19. Accordingly, the observer catches the light. The direct vision LCD system displays an image in this way. According to this example, an image having a contrast of 10 is obtained in a black and white display. The LCD device having additional circuits can be compact. When the LCD device is used in a direct vision LCD system, which does not require an enlarging projection mechanism as the projection LCD system does, the LCD system can be more compact.

EXAMPLE 7

According to the present invention, an extremely compact LCD device is realized. Therefore, the LCD device can be applied to a viewfinder of an imaging apparatus such as a video tape recorder. In the viewfinder, since the eye and the display apparatus are close to each other, large pixels result in a rough display plane. Accordingly, the pixels should be especially microscopic. In a conventional viewfinder, a display device having a size of 0.94 inches across, 220×320 (vertical×horizontal) pixels, and a pixel pitch of 65 μm×60 μm is used. According to the present invention, a display device having a pixel pitch of approximately 20 μm can be realized. As a result, a viewfinder displaying a clear image owing to the microscopic pixels can be realized.

EXAMPLE 8

A three-dimensional display apparatus should present an image which looks like a real object. Accordingly, an extremely bright image is required. According to the present invention, since a clear image can be realized owing to the microscopic pixels and a high-speed switching of the display plane, a high quality three-dimensional image can be obtained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A reflection type display device comprising:
   a single crystal silicon semiconductor substrate having a first surface and a second surface,
   a transparent substrate which can transmit light and is formed above said first surface of said semiconductor substrate,
   a liquid crystal layer interposed between said transparent substrate and said semiconductor substrate,
   a transparent counter electrode formed between said liquid crystal layer and said transparent substrate,
   a reflective electrode for reflecting the light, said reflective electrode being formed between said liquid crystal layer and said semiconductor substrate, and
   a switching element for controlling a voltage between said reflective electrode and said transparent counter electrode, said switching element being formed on said first surface of said semiconductor substrate and being electrically connected to the reflective electrode, and said reflective electrode substantially covering said switching element.

2. A reflection type display device according to claim 1, wherein said liquid crystal layer includes an organic polymer and a liquid crystal.

3. A reflection type display device according to claim 1, wherein said switching element includes a MOS transistor formed on said first surface of said semiconductor substrate.

4. A reflection type display device according to claim 3, wherein said reflective electrode is connected to a drain of said MOS transistor, and said reflective electrode covers said MOS transistor.

5. A reflection type display device according to claim 3, wherein said MOS transistor includes a source electrode, drain electrode, and gate electrode, and a distance between said source electrode and said gate electrode is shorter than a distance between said gate electrode and said drain electrode.

6. A reflection type display device according to claim 5, further comprising an insulating layer formed between said semiconductor substrate and said reflective electrode,
wherein said insulating layer has a throughhole which reaches said drain electrode, and said reflective electrode is connected with said drain electrode through said throughhole.

7. A reflection type display device according to claim 3, wherein said MOS transistor is a diffusion self aligned MOS transistor.

8. A reflection type display device according to claim 1, further comprising a driving integrated circuit electrically connected to said switching element, said driving integrated circuit being formed on said first surface of said semiconductor substrate.

9. A reflection type display device according to claim 8, further comprising a heat radiating fin for dissipating heat generated in said driving integrated circuit, said heat radiating fin being adhered on said second surface of said semiconductor substrate.

10. A reflection type display device comprising:
a transparent substrate which can transmit light,
a single crystal silicon semiconductor substrate having a main surface facing to said transparent substrate,
a liquid crystal layer interposed between said transparent substrate and said semiconductor substrate,
a transparent counter electrode formed between said liquid crystal layer and said transparent substrate, and
a plurality of pixels arranged in a matrix on said main surface of said semiconductor substrate,
wherein each of said plurality of pixels is divided into three portions respectively attached with red, green, and blue filters,
each of said three portions includes a reflective electrode formed between said liquid crystal layer and said semiconductor substrate, and a switching element formed on said main surface of said semiconductor substrate and connected to said reflective electrode,
said reflective electrode reflects said light which passed through said transparent substrate, and
said switching element controls a voltage between said reflective electrode and said transparent counter electrode.

11. A reflection type display device according to claim 10, wherein said liquid crystal layer includes an organic polymer and a liquid crystal material.

12. A reflection type display device according to claim 10, wherein said switching element includes a MOS transistor formed on said main surface of said semiconductor substrate.

13. A reflection type display device according to claim 12, wherein said reflective electrode is connected to a drain of said MOS transistor, and said reflective electrode covers said MOS transistor.

14. A display system comprising:
three liquid crystal display devices, and
red, green, and blue filters respectively attached to said three liquid crystal display devices;
wherein each of said devices comprises a transparent substrate which can transmit light, a single crystal silicon semiconductor substrate having a main surface facing to said transparent substrate, a liquid crystal layer interposed between said transparent substrate and said semiconductor substrate, a transparent counter electrode formed between said liquid crystal layer and said transparent substrate, a reflective electrode formed between said liquid crystal layer and said semiconductor substrate, and a switching element formed on said main surface of said semiconductor substrate,
said reflective electrode reflects said light which passes through said transparent substrate, and
said switching element is electrically connected to said reflective electrode and controls a voltage between said reflective electrode and said transparent counter electrode., said reflective electrode substantially covering said switching element.

15. A liquid crystal display system according to claim 14, wherein said liquid crystal layer includes an organic polymer and a liquid crystal material.

16. A display system comprising:
a light source;
a reflection type display device including a transparent substrate which can transmit light emitted from said light source, a single crystal silicon semiconductor substrate having a main surface facing to said transparent substrate, a liquid crystal layer interposed between said transparent substrate and said semiconductor substrate, a transparent counter electrode formed between said liquid crystal layer and said transparent substrate reflective electrode for reflecting said light formed between said liquid crystal layer and said semiconductor substrate, and a switching element formed on said main surface of said semiconductor substrate;
optical means which selectively transmit said light reflected by said reflective electrode; and
a screen for receiving said light transmitted through said optical means,
wherein said switching element is electrically connected to said reflective electrode and controls a voltage between said reflective electrode and said transparent counter electrode, said reflective electrode substantially covering said switching element.

17. A display system according to claim 16, wherein said light emitted said light source is incident on said reflective electrode at an angle.

18. A display system according to claim 16, wherein said liquid crystal layer includes an organic polymer and a liquid crystal material.

* * * * *